United States Patent [19]
Neri et al.

[11] Patent Number: 5,411,361
[45] Date of Patent: May 2, 1995

[54] TRUCK FOR HANDLING PALLETS

[75] Inventors: Armando Neri, Bologna; Verter Cesari, Granarolo Emilia, both of Italy

[73] Assignee: G.D. S.p.A., Bologna, Italy

[21] Appl. No.: 136,860

[22] Filed: Oct. 18, 1993

[30] Foreign Application Priority Data

Oct. 28, 1992 [IT] Italy ............................... BO92A0377

[51] Int. Cl.6 ............................ B60P 1/44; B66F 9/12
[52] U.S. Cl. ..................................... 414/664; 414/668
[58] Field of Search ................ 414/544, 663, 664, 668; 187/9 R

[56] References Cited

U.S. PATENT DOCUMENTS

| | | | |
|---|---|---|---|
| 3,167,201 | 1/1965 | Quayle | 414/664 |
| 3,168,956 | 2/1965 | Jinks et al. | 414/544 |
| 3,958,703 | 5/1976 | Marco et al. | 414/544 |
| 5,211,527 | 5/1993 | Ahlsen et al. | 414/668 X |

FOREIGN PATENT DOCUMENTS

| | | | |
|---|---|---|---|
| 3226462 | 1/1984 | Germany | 414/664 |
| 957995 | 5/1964 | United Kingdom . | |
| 1343432 | 1/1974 | United Kingdom . | |
| 9210422 | 6/1992 | WIPO | 414/544 |

Primary Examiner—Michael S. Huppert
Assistant Examiner—Stephen Gordon
Attorney, Agent, or Firm—Guido Modiano; Albert Josif; Daniel O'Byrne

[57] ABSTRACT

A truck for handling pallets by means of a fork which vertically and horizontally is movable with respect to a supporting chassis; the chassis has a planar U-shaped configuration forming a central cavity which is closed toward the outside by a movable element of a bumper which surrounds the chassis, and is provided with two shoulders, each of which supports a guide which is slidingly engaged by a respective arm extending parallel and laterally with respect to the fork from a slider which is arranged between the shoulders and supports the fork so that it can slide vertically.

13 Claims, 3 Drawing Sheets

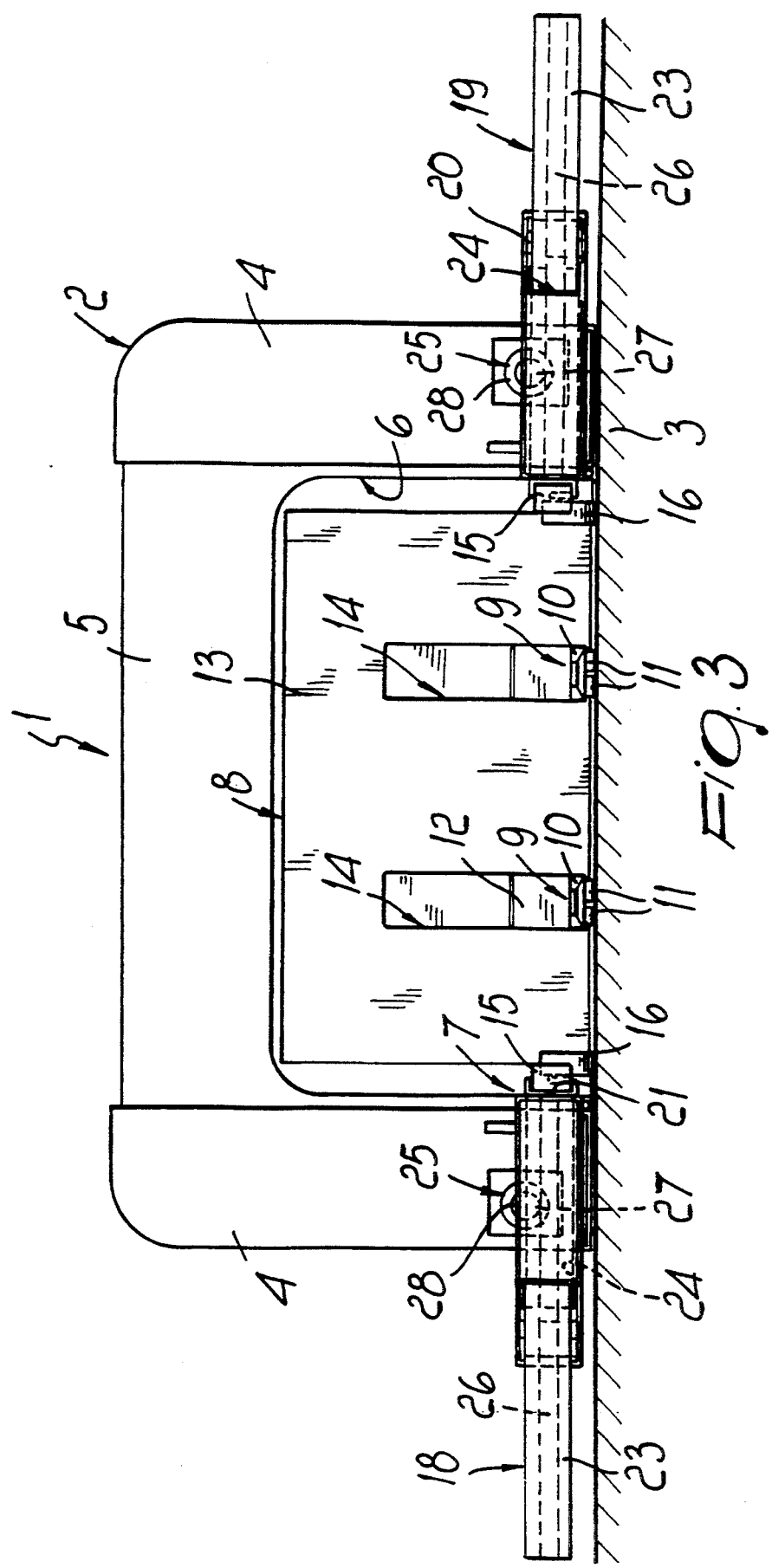

TRUCK FOR HANDLING PALLETS

BACKGROUND OF THE INVENTION

The present invention relates to a truck for handling pallets.

In particular, the present invention relates to a lift truck for handling pallets, of the type comprising a motorized chassis provided with an open cavity, a fork, a slider supporting the fork and coupled to the chassis to move said fork longitudinally with respect to the chassis between a retracted position inside the cavity and an extracted position outside said cavity, and bumper means which at least partially surround the chassis and comprise a portion for closing the open end of the cavity.

Known lift trucks of the above described type have some drawbacks which are mainly due to the presence of said bumper portion arranged so as to close the cavity normally accommodating the fork when it is inactive.

The fork, in order to reach a normal pickup/depositing position below a pallet starting from its normal inactive retracted position, must in fact rise above said bumper portion, move longitudinally into its extracted position, move downward again outside said bumper portion until it reaches a lowered position below the flat surface of the pallet to be picked up, and then move longitudinally, together with the entire truck, to insert itself beneath the pallet.

To summarize, therefore, during a pickup operation the truck cannot arrange itself directly at the side of the pallet to be picked up but must leave, between itself and the pallet, a distance, not always available, which must be sufficient to allow the fork to reach its above mentioned lowered position.

During its return stroke, the loaded fork performs the above described movement sequence in reverse, and is forced to lift the pallet above said bumper portion starting from its above described lowered position, which is equivalent to a maximum range of said fork. In this manner, the truck is subjected to overturning moments such as to require the use of heavy counterweights.

SUMMARY OF THE INVENTION

The aim of the present invention is to improve trucks of the above specified type so as to eliminate the above described drawbacks.

According to the present invention, a lift truck for handling pallets is provided which is of the type comprising a motorized chassis which forms a cavity having an open end; a fork; a slider which supports said fork and is coupled to the chassis to move said fork longitudinally with respect to the chassis between a retracted position inside the cavity and an extracted position outside said cavity; and bumper means which at least partially surround said chassis and comprise a portion for closing the open end of said cavity, characterized in that said closing portion is movable between a position for closing the open end of said cavity and a position for opening it; said slider comprising two parallel lateral arms arranged to the sides of said fork; and guiding means being arranged inside said cavity to accommodate said arms so that they can slide longitudinally.

BRIEF DESCRIPTION OF THE DRAWINGS

The invention is now described with reference to the accompanying drawings, illustrating a non-limitative embodiment thereof, wherein:

FIG. 3 is an enlarged-scale view, taken along the arrow A of FIG. 1; and

DESCRIPTION OF THE PREFERRED EMBODIMENTS

Figure 2:
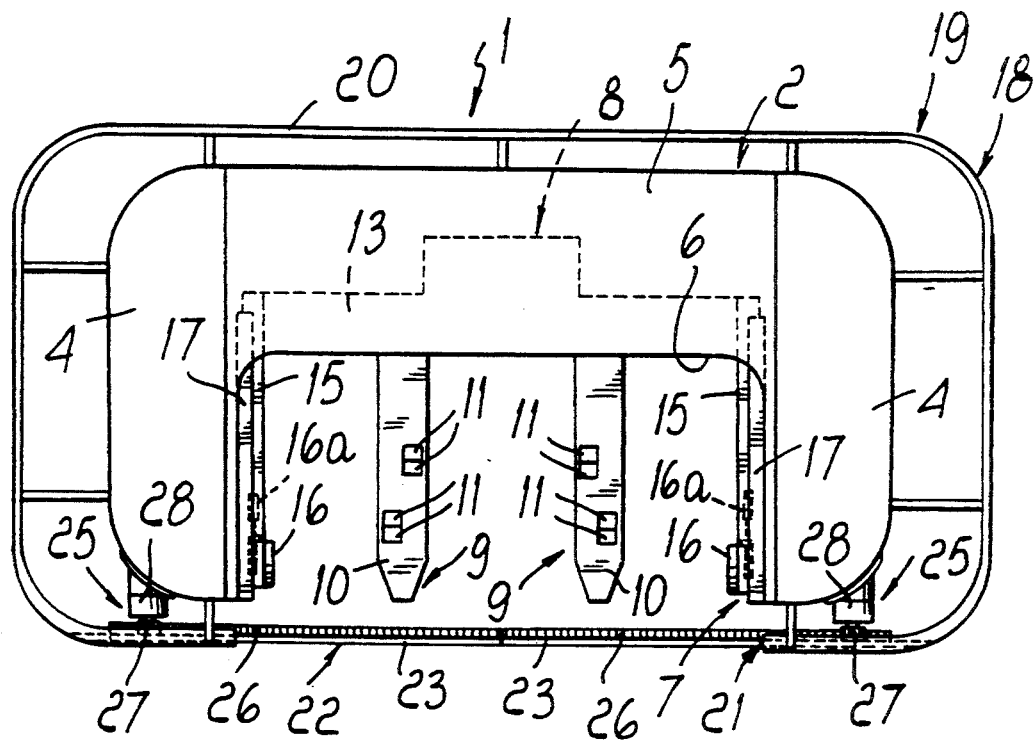
FIGS. 1 and 2 are plan views of a preferred embodiment of the truck according to the present invention in two different operating positions.
Figure 1:
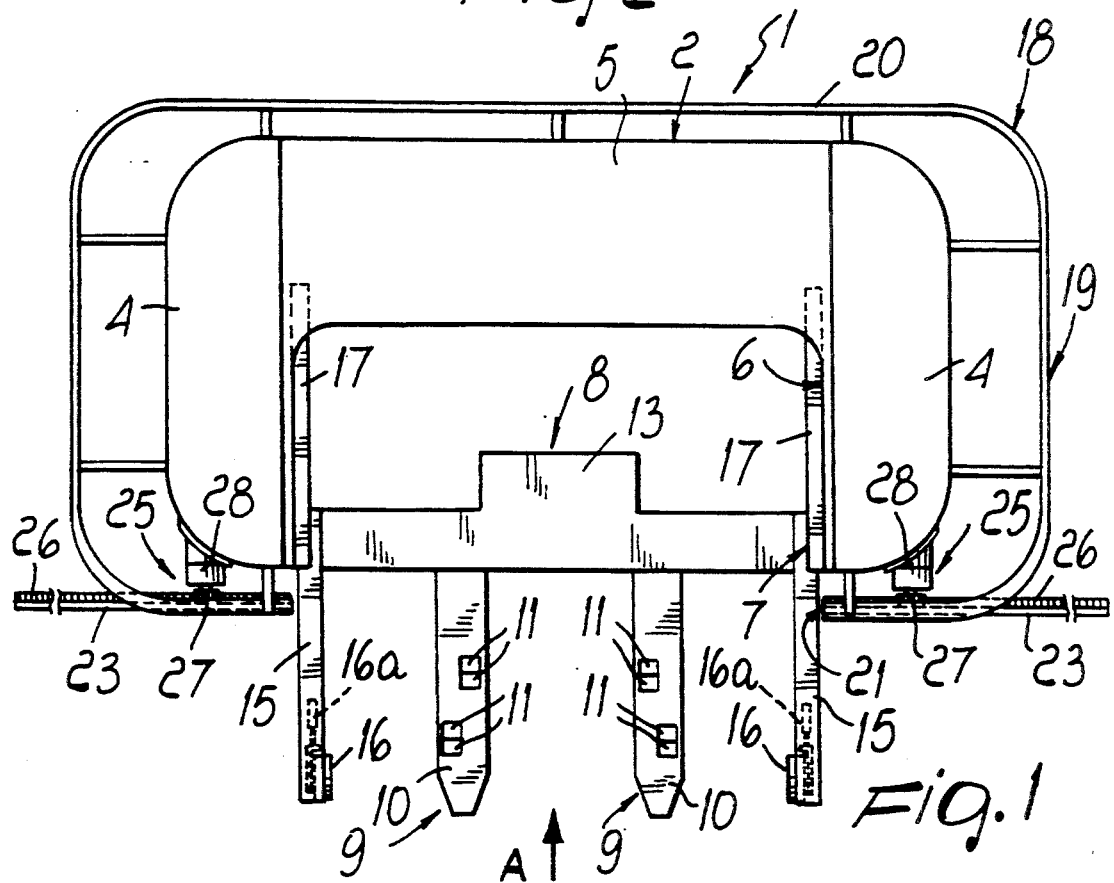

In FIGS. 1 to 3, the reference numeral 1 designates a lift truck comprising a chassis 2 which rests on a floor 3 with the interposition of a plurality of wheels, not shown, and has a substantially planar U-shaped configuration. The chassis 2 is formed by two lateral shoulders 4 which are mutually joined by a cross-member 5 at one of their rear ends and form, together with said cross-member 5, a cavity 6 provided, at the front, with an opening 7 which is laterally delimited by the shoulders 4.

Figure 5:
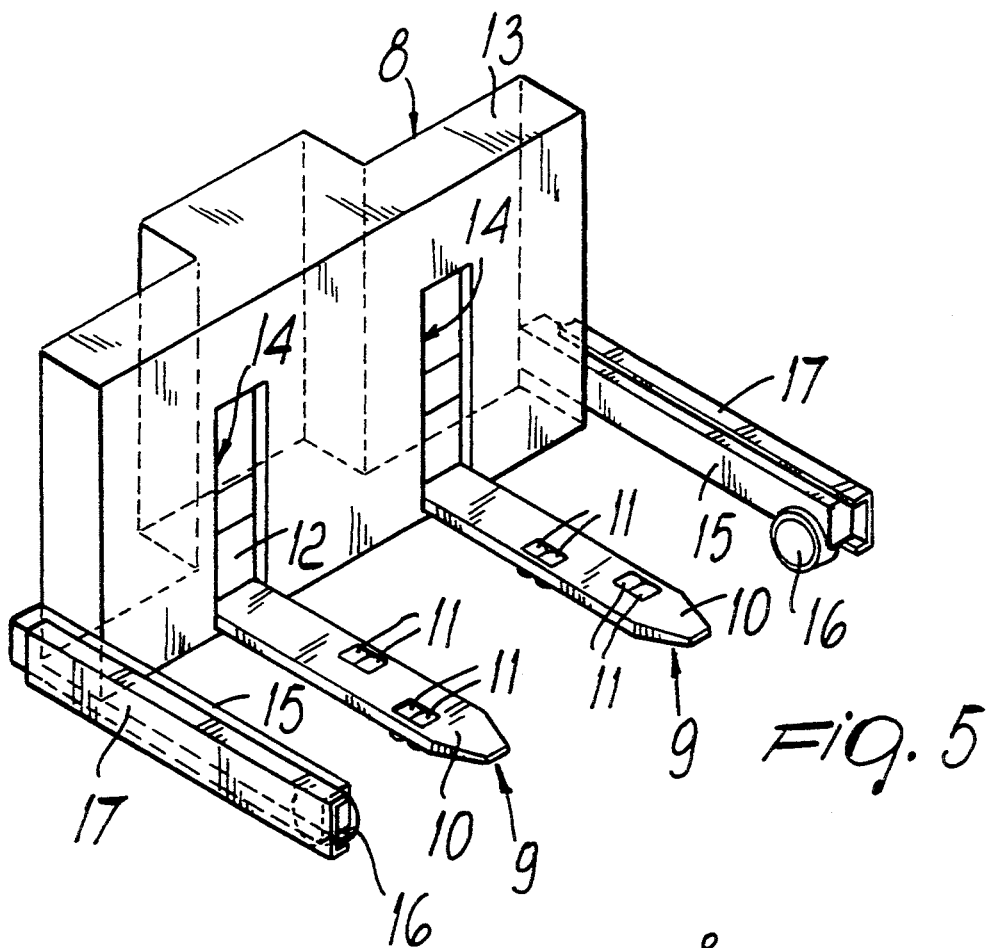
FIGS. 4 and 5 are perspective views of a same detail of FIG. 1, illustrated in two different operating conditions.
Figure 4:
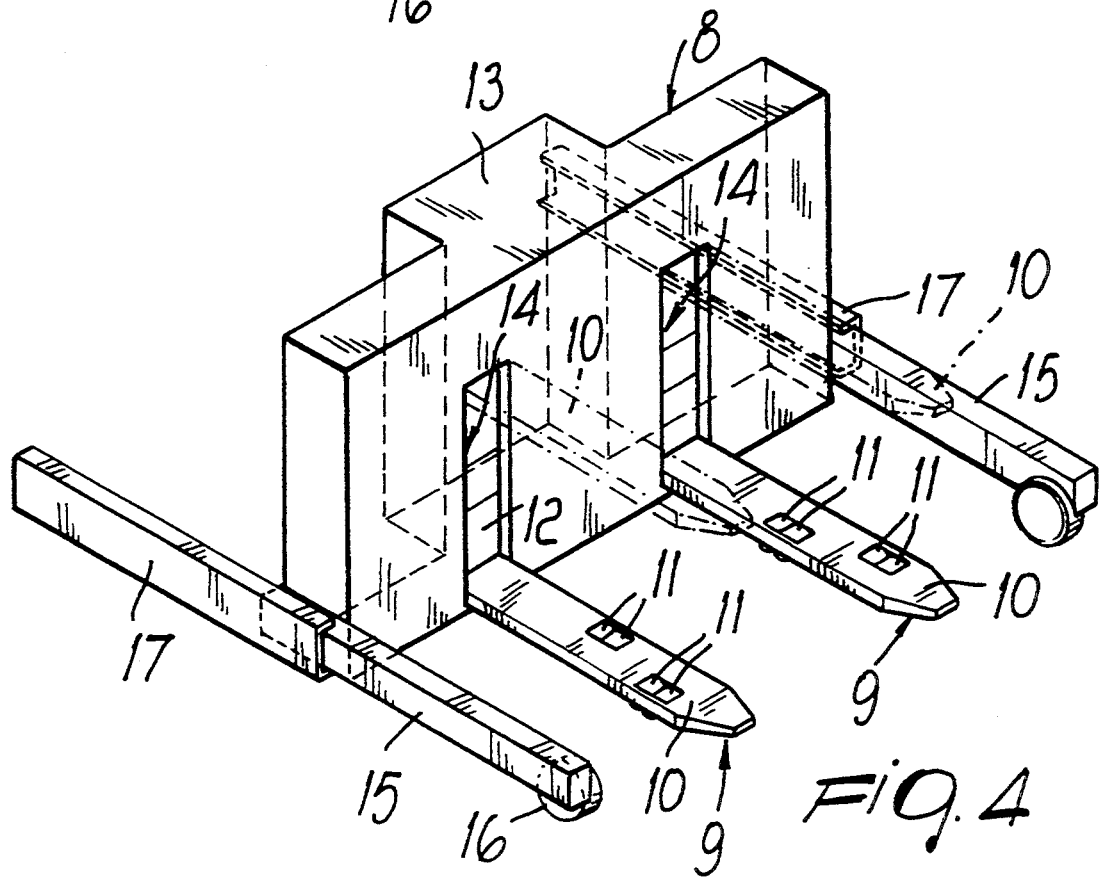

The truck 1 furthermore comprises a motorized slider 8 frontally supporting a fork 9 which is also motorized and in turn comprises two arms 10 being parallel to the floor 3; each arm has, in a known manner, a pair of wheels 11 which may have, in a known manner, a known lifting device which is not shown. A vertical plate 12 being rigidly connected to each arm 10 at its rear end, is accommodated inside a central body 13 of the slider 8, and constitutes a slider for the sliding of the associated arm 10 along the slider 8 in a vertical direction, along a respective guide 14 and under the thrust of a known hydraulic actuation device, not shown, between a raised position, shown in dot-and-dash lines in FIG. 4, and a lowered position, shown in solid lines in FIGS. 3, 4 and 5. When the plates 12 are arranged in their lowered position, the arms 10 arrange themselves adjacent to the floor 3, and the wheels 11 arrange themselves in contact with said floor 3.

In a plan view the slider 8 has a substantially U-shaped configuration and comprises, in addition to the central body 13, two arms 15 extending in mutually parallel positions and parallel to the arms 10, the arms 15 being arranged on opposite sides of said two arms 10, and protruding from the central body 13 on the same side as the fork 9. Each arm 15 is connected to the central body 13 proximate to a lower end of said body 13 and rotatably supports, proximate to its free end, a respective wheel 16 which can be lacking in some cases and is movable towards and away from a lowered operating position, in contact with the floor 3, under the thrust of a known actuation device 16a (FIGS. 1 and 2).

To summarize, the slider 8 is always supported at least partially by the floor 3, and is slidingly coupled by means of the arms 15 to the shoulders 4 in order to move, under the thrust of a known actuation device, not shown, between a retracted inactive position, in which the fork 9 is accommodated inside the cavity 6, and an extracted active position, in which the fork 9 is fully arranged outside the cavity 6. For this purpose, each one of the arms 15 engages, in an axially sliding manner, a respective guide 17 formed by a C-shaped profiled element which is parallel to the arms 10 and is rigidly connected to an internal lateral surface of the related shoulder 4.

Again with reference to FIGS. 1 to 3, the truck 1 is finally provided with a safety bumper 18 which comprises an annular element 19 located adjacent to the floor 3 all around the chassis 2 and formed by a fixed rear portion 20 which extends along the perimeter of the chassis 2 and forms, at the front, an opening 21 facing and being aligned with the opening 7 of the cavity 6, and a front portion 22 which is arranged across the opening 7 of the cavity 6. The portion 22 is formed by a pair of gate-like rods 23, each of which engages, in an axially sliding manner, a respective guiding channel 24 formed in a related end portion of the portion 20, and is axially movable, under the thrust of a respective rack-and-pinion actuation device 25, between a closure position, in which the rod 23 joins the other rod 23 at their respective free ends to close the opening 21 and thus the opening 7, and an open position in which the rods are moved apart and said openings 21 and 7 are open.

In particular, according to what is shown in FIGS. 1 and 3, each device 25 comprises a rack 26 which is rigidly connected to the associated rod 23 and a pinion 27 which meshes with the rack 26 and is keyed on the output shaft of an associated motor 28 which is rigidly coupled to an associated adjacent shoulder 4.

During use, the longitudinal movements of the fork 9 from the retracted position inside the cavity 6 to the extracted position occur upon movement of the rods 23 into their open position. Consequently, all the longitudinal movements of the fork 9 can be performed while said fork 9 is arranged in its lowered position, and while the associated wheels 11 are in contact with the floor 3. Consequently, the arms 10 can arrange themselves directly beneath a pallet (not shown) even if said pallet is arranged directly adjacent to the opening 21, and even if the wheels 16 are missing or are kept spaced from the floor 3 it is still possible to move said pallet between said retracted and extracted positions while keeping the fork in a slightly raised position but with its wheels 11 still in contact with the floor 3.

To summarize, therefore, the overturning moments applied by the fork 9 to the chassis 2 can be reduced substantially to zero even when the fork 9 is loaded and is using its maximum outreach. These moments become non-zero only if the wheels 16 are not provided and if the fork 9 moves into its raised position when said fork 9 is in extracted position. However, if the wheels 16 are present, as in the illustrated example, and are moved by their actuators 16a into contact with the floor 3, even the lifting of a pallet (not shown) by the fork 9 arranged in its extracted position entails the onset of substantially negligible overturning moments.

The invention thus conceived is susceptible to numerous modifications and variations, all of which are within the scope of the inventive concept. All the details may furthermore be replaced with other technically equivalent elements.

In practice, the material employed, as well as the dimensions, may be any according to the requirements.

We claim:

1. Lift truck for handling pallets comprising:
a motorized chassis adapted for movement on a supporting surface, said chassis having a rear U-shaped configuration with a front open end, said configuration forming a cavity, said cavity being laterally delimited by two lateral shoulders, said lateral shoulders being joined at an end thereof by a cross-member;
a bumper means surrounding at least partially said chassis, said bumper means comprising a rear fixed portion extending around said rear U-shaped configuration and a front portion facing said front open end, said front portion being movable between a closure position for closing said cavity at said front open end and an open position;
a fork, said fork being longitudinally and vertically movable with respect to said chassis;
a slider which supports said fork, said slider being coupled to the chassis to move said fork longitudinally with respect to the chassis between a retracted position inside said cavity and an extracted position outside said cavity, and said slider comprising two parallel lateral arms arranged at sides of said fork;
guiding means being arranged inside said cavity for longitudinal sliding of said arms, said guiding means being supported by said lateral shoulders;
wherein said arms are extendable for being positioned adjacent to said supporting surface, and rest means are further provided at a free end of said arms, said rest means being movable toward and away from an operating position in contact with said supporting surface, and wherein said fork is provided with wheel means arranged proximate to a free end thereof, said wheel means being adapted to contact said supporting surface in a lowered position of said fork.

2. Truck according to claim 1, wherein said slider has a substantially planar U-shaped configuration and comprises, further to said lateral arms, a central body which is arranged transversely to said arms and is rigidly coupled thereto, said central body supporting said fork, which extends from said central body on the same side as said arms.

3. Truck according to claim 2, wherein said fork is rigidly connected at an end thereof opposed to said free end to a vertical plate, said vertical plate being accommodated inside said central body of said slider, and said plate being further adapted to slide vertically with respect to said slider, thereby said fork being vertically slidable between said lowered position and a raised position.

4. Truck according to claim 1, wherein said guiding means comprises guiding profiled elements, said profiled elements being rigidly connected to said lateral shoulders and arranged parallel to said arms, said arms being connected to said slider and engaging in a sliding manner said profiled elements thereby said slider being slidingly movable between said retracted position inside said cavity and said extracted position outside said cavity.

5. Truck according to claim 1, wherein said rear fixed portion of said bumper means is rigidly connected to said chassis, said front portion being connected in a slidingly movable manner to said rear fixed portion, thereby said front portion being slidingly movable with respect to said fixed portion between said closure and open positions for closing and opening said cavity.

6. Truck according to claim 5, further comprising an actuation device for moving said front portion of said bumper means, said front portion comprising a pair of slidingly movable rods, said rods being movable between a closure position in which said rods are joined at an end thereof for closing said front open end, and an open position in which said rods are moved apart.

7. Lift truck for handling pallets comprising:
a motorized chassis adapted for movement on a supporting surface, said chassis having a rear U-shaped configuration with a front open end, said configuration forming a cavity, said cavity being laterally delimited by two lateral shoulders, said lateral shoulders being joined at an end thereof by a crossmember;
a bumper means surrounding at least partially said chassis, said bumper means comprising a rear fixed portion extending around said rear U-shaped configuration and a front portion facing said front open end, said front portion being movable between a closure position for closing said cavity at said front open end and an open position;
a fork, said fork being longitudinally and vertically movable with respect to said chassis, said fork comprising wheel means arranged proximate to a free end thereof, said wheel means being adapted to contact said supporting surface in a lowered position of said fork;
a slider which supports said fork, said slider being slidingly coupled to the chassis and adapted to move said fork longitudinally with respect to the chassis between a retracted position inside said cavity and an extracted position outside said cavity; wherein said slider comprises two parallel lateral arms arranged at sides of said fork, said arms being extendable for being positioned adjacent to said supporting surface, rest means being further provided at a free end of said arms, said rest means being movable toward and away from an operating position in contact with said supporting surface.

8. Truck according to claim 7, wherein said slider has a substantially planar U-shaped configuration and comprises, further to said lateral arms, a central body which is arranged transversely to said arms and is rigidly coupled thereto, said central body supporting said fork, which extends from said central body on the same side as said arms.

9. Truck according to claim 7, wherein said fork is rigidly connected at an end thereof opposed to said free end to a vertical plate, said vertical plate being accommodated inside said central body of said slider, and said plate being further adapted to slide vertically with respect to said slider, thereby said fork being vertically slidable between said lowered position and a raised position.

10. Truck according to claim 7, further comprising guiding means, said guiding means being supported by said lateral shoulders and arranged inside said cavity for longitudinal sliding of said arms.

11. Truck according to claim 10 wherein said guiding means comprises guiding profiled elements, said profiled elements being rigidly connected to said lateral shoulders and arranged parallel to said arms, said arms being connected to said slider and engaging in a sliding manner said profiled elements thereby said slider being slidingly movable between said retracted position inside said cavity and said extracted position outside said cavity.

12. Truck according to claim 7, wherein said rear fixed portion of said bumper means is rigidly connected to said chassis, said front portion being connected in a slidingly movable manner to said rear fixed portion, thereby said front portion being slidingly movable with respect to said fixed portion between said closure and open positions for closing and opening said cavity.

13. Truck according to claim 12, further comprising an actuation device for moving said front portion of said bumper means, said front portion comprising a pair of slidingly movable rods, said rods being movable between a closure position in which said rods are joined at an end thereof for closing said front open end, and an open position in which said rods are moved apart.

* * * * *